United States Patent
Ebara et al.

(10) Patent No.: US 12,169,146 B2
(45) Date of Patent: Dec. 17, 2024

(54) SUPERCONDUCTING MAGNET DEVICE

(71) Applicant: SUMITOMO HEAVY INDUSTRIES, LTD., Tokyo (JP)

(72) Inventors: Yuta Ebara, Yokosuka (JP); Yukio Mikami, Yokosuka (JP); Nobuaki Takahasi, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 263 days.

(21) Appl. No.: 17/651,067

(22) Filed: Feb. 15, 2022

(65) Prior Publication Data

US 2022/0270795 A1    Aug. 25, 2022

(30) Foreign Application Priority Data

Feb. 19, 2021 (JP) ................... 2021-025479

(51) Int. Cl.
*H01F 6/06* (2006.01)
*G01K 3/00* (2006.01)
*G01K 13/00* (2021.01)
*H01F 6/00* (2006.01)

(52) U.S. Cl.
CPC ........... *G01K 3/005* (2013.01); *G01K 13/006* (2013.01); *H01F 6/06* (2013.01); *H01F 6/008* (2013.01)

(58) Field of Classification Search
CPC ........ G01K 3/005; G01K 13/006; H01F 6/06; H01F 6/008; H01F 6/00; H01F 27/022; H01F 27/2828; H01F 27/402; H01F 2027/406; Y10S 505/879
USPC .......................................................... 335/216
See application file for complete search history.

(56) References Cited

U.S. PATENT DOCUMENTS

| 5,936,499 A * | 8/1999 | Eckels ............... G01R 33/3804 |
| | | 505/892 |
| 11,105,540 B2 | 8/2021 | Ebara et al. |
| 2014/0274724 A1* | 9/2014 | Inoue ....................... H01F 6/04 |
| | | 335/216 |
| 2016/0116555 A1* | 4/2016 | Nemoto .................... H01F 6/00 |
| | | 324/322 |
| 2019/0024950 A1* | 1/2019 | Ebara ....................... F25B 9/14 |
| 2020/0355409 A1* | 11/2020 | Ebara .................... F25D 19/006 |

FOREIGN PATENT DOCUMENTS

| JP | H01239902 A | 9/1989 |
| JP | 2001339879 A | 12/2001 |
| JP | 2009283678 A | 12/2009 |
| JP | 5367393 B2 | 12/2013 |
| JP | 2016201507 A | 12/2016 |
| JP | WO2017170265 A1 | 2/2019 |

* cited by examiner

*Primary Examiner* — Mohamad A Musleh
*Assistant Examiner* — Lisa N Homza
(74) *Attorney, Agent, or Firm* — HEA Law PLLC

(57) ABSTRACT

There is provided a superconducting magnet device including a superconducting coil, a vacuum vessel that accommodates the superconducting coil, a current lead that is connected to the superconducting coil and installed in the vacuum vessel, a power supply cable that is disposed outside the vacuum vessel and connected to the current lead, and a heating unit that is disposed apart from the current lead and heats the current lead via the power supply cable.

7 Claims, 2 Drawing Sheets

SUPERCONDUCTING MAGNET DEVICE

RELATED APPLICATIONS

The content of Japanese Patent Application No. 2021-025479, on the basis of which priority benefits are claimed in an accompanying application data sheet, is in its entirety incorporated herein by reference.

BACKGROUND

Technical Field

Certain embodiments of the present invention relate to a superconducting magnet device.

Description of Related Art

Generally, superconducting magnet devices include a superconducting coil, and a vacuum vessel that accommodates the superconducting coil in a state of being cooled to a cryogenic temperature. A coil electrode is provided on the outside of the vacuum vessel in order to supply power to the superconducting coil from the outside. The coil electrode is cooled by heat conduction from the superconducting coil. For that reason, the moisture in the air around the vacuum vessel may freeze on the coil electrode. In the related art, in order to prevent this, it is known to operate a heater attached to the coil electrode to directly heat the coil electrode.

SUMMARY

According to an embodiment of the present invention, there is provided a superconducting magnet device including a superconducting coil, a vacuum vessel that accommodates the superconducting coil, a current lead that is connected to the superconducting coil and installed in the vacuum vessel, a power supply cable that is disposed outside the vacuum vessel and connected to the current lead, and a heating unit that is disposed apart from the current lead and heats the current lead via the power supply cable.

DETAILED DESCRIPTION

Figure 1:
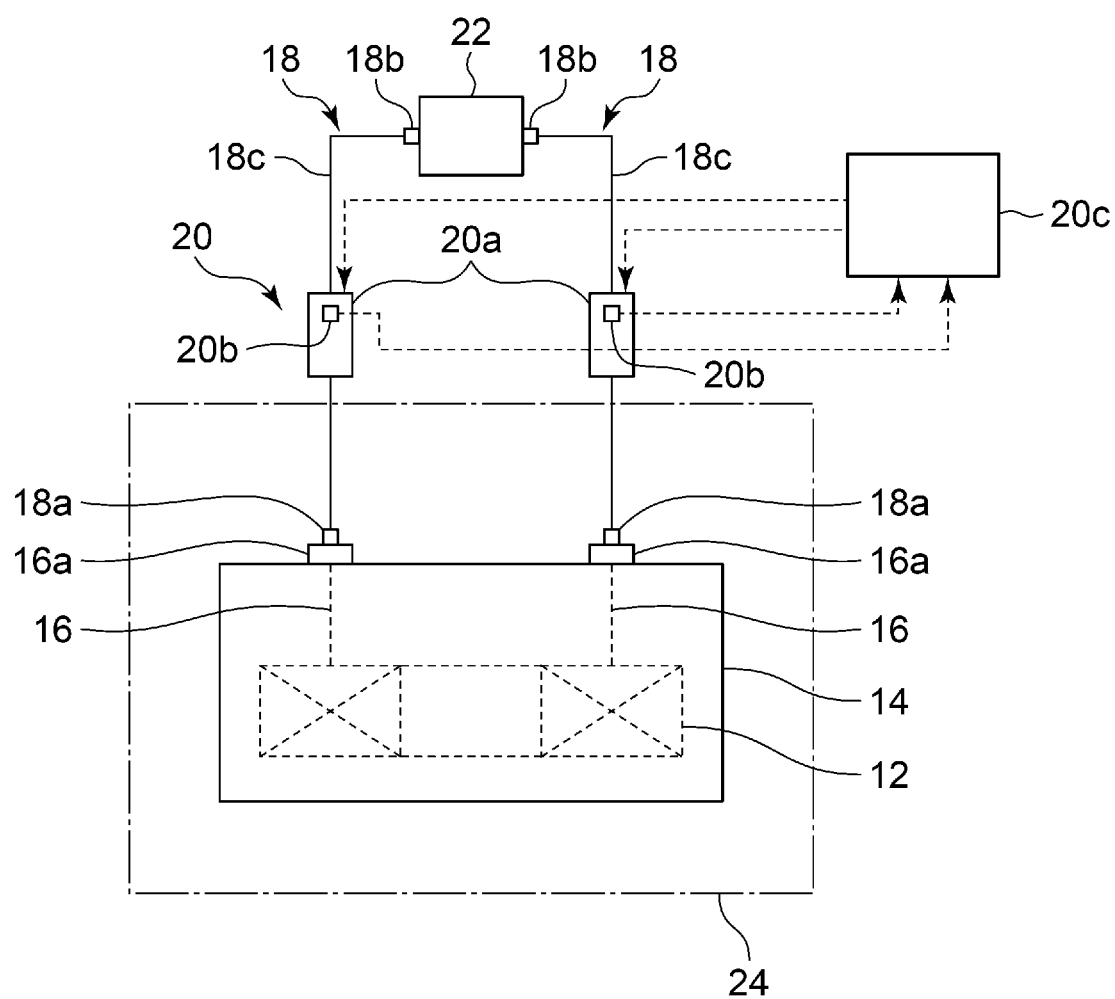
FIG. 1 is a schematic view showing a superconducting magnet device to an embodiment.

The present inventor has studied the above superconducting magnet device and has recognized the followings. The heater attached to the coil electrode has an increased risk of failure due to a leaked magnetic field caused by a strong magnetic field generated by a superconducting magnet device. In addition, in a case where the superconducting magnet device is mounted on an accelerator, the radiation dose is high in the vicinity of the superconducting magnet device, so that the risk of failure of the heater is further increased.

Ina case where the heater has failed, maintenance work such as repair or replacement of the heater is required, but the access of the worker is restricted by the leaked magnetic field and radiation, and it is difficult to perform the maintenance work while operating the superconducting magnet device. Stopping the superconducting magnet device for the maintenance work is not desirable because this results in downtime of the superconducting magnet device.

It is desirable to reduce the risk of failure of an antifreezing heating unit in a superconducting magnet device.

Hereinafter, embodiments for carrying out the present invention will be described in detail with reference to the drawings. In the description and drawings, the same or equivalent components, members, and processing are designated by the same reference numerals, and redundant descriptions will be appropriately omitted. The scales and shapes of the respective parts shown in the figures are set for convenience in order to facilitate the description, and should not be interpreted as limiting unless otherwise specified. The embodiments are merely examples and do not limit the scope of the present invention. All the features and combinations described in the embodiments are not necessarily essential to the invention.

FIG. 1 is a schematic view showing a superconducting magnet device 10 according to an embodiment. The superconducting magnet device 10 includes a superconducting coil 12, is mounted on, for example, a high-magnetic-field utilization device as a magnetic field source of an accelerator such as a cyclotron or other high-magnetic-field utilization device, and can generate a high magnetic field required for the device.

The superconducting coil 12 is thermally coupled to, for example, a two-stage Gifford-McMahon (GM) cryocooler or other type of cryocooler (not shown) and is used in a state of being cooled to a cryogenic temperature equal to or lower than the superconducting transition temperature. In this embodiment, the superconducting magnet device 10 is configured as a so-called conduction cooling type in which the superconducting coil 12 is directly cooled by the cryocooler instead of being immersed in a cryogenic liquid refrigerant such as liquid helium. In addition, the superconducting coil 12 may be cooled by an immersion cooling method in which the superconducting coil 12 is immersed in the cryogenic liquid refrigerant.

Additionally, the superconducting magnet device 10 includes a vacuum vessel 14 that accommodates the superconducting coil 12, a current lead 16 that is connected to the superconducting coil 12 and installed in the vacuum vessel 14, a power supply cable 18 that is disposed outside the vacuum vessel 14 and connected to the current lead 16, and a heating unit 20 that is disposed apart from the current lead 16 and heats the current lead 16 via a power supply cable 18.

The vacuum vessel 14 provides a cryogenic vacuum environment suitable for bringing the superconducting coil 12 into a superconductive state in an internal space thereof. The vacuum vessel 14 is, for example, a cryostat. As an example, the superconducting coil 12 has an annular shape, and the vacuum vessel 14 has a donut shape surrounding the superconducting coil 12. The vacuum vessel 14 is formed of a metallic material such as stainless steel or other suitable high-strength material to withstand ambient pressure (for example, atmospheric pressure).

The current lead 16 connects the superconducting coil 12 to a power supply device 22 via the power supply cable 18. The current leads 16 are provided in a pair at least on a positive electrode side and a negative electrode side. An end portion of the current lead 16 on the ambient environment side (room temperature side) is provided with an airtight terminal 16a for introducing a current into the vacuum vessel 14 through a wall portion of the vacuum vessel 14. In the shown example, the airtight terminal 16a is installed on an upper surface of the vacuum vessel 14, but is not limited to this disposition. An end portion of the current lead 16 on the opposite side (low temperature side) is connected to the superconducting coil 12.

The power supply cable 18 has a first end portion 18a, a second end portion 18b, and a cord portion 18c that connects the first end portion 18a and the second end portion 18b to each other. The first end portion 18a is connected to the airtight terminal 16a by, for example, a connector connection or other appropriate connection method. The second end portion 18b is connected to the power supply device 22 by an appropriate connection method.

In the power supply cable 18, an operating temperature upper limit value based on the physical properties of the power supply cable 18, such as the heat resistant temperature of a synthetic resin material forming the sheath of the cord portion 18c, is defined. Accordingly, it is recommended that the power supply cable 18 be used in an operating environment that does not exceed the operating temperature upper limit value.

The heating unit 20 includes a heating element 20a mounted on the power supply cable 18, a temperature sensor 20b that measures the temperature of the power supply cable 18, and a controller 20c that controls the output of the heating unit 20 on the basis of the measured temperature of the power supply cable 18 by the temperature sensor 20b such that the measured temperature is equal to or lower than the operating temperature upper limit value of the power supply cable 18.

The heating element 20a is a contact-type heating element such as a rubber heater and is attached to the cord portion 18c of the power supply cable 18. The heating element 20a may be attached to the cord portion 18c so as to be wound around a sheath of the cord portion 18c. Accordingly, the heating element 20a is disposed on the power supply cable 18 apart from the airtight terminal 16a and is not attached to the airtight terminal 16a.

To facilitate replacement, the heating element 20a may be detachably mounted on the power supply cable 18.

The temperature sensor 20b is a general-purpose temperature sensor, and is attached to the power supply cable 18 so as to measure the temperature of a heated portion of the power supply cable 18 by the heating element 20a. The temperature sensor 20b is attached to the cord portion 18c between the heating element 20a and the cord portion 18c or adjacent to or close to the heating element 20a.

The controller 20c is electrically connected to the temperature sensor 20b so as to receive a temperature signal output by the temperature sensor 20b. The temperature signal indicates the measured temperature of the heated portion of the power supply cable 18 by the heating element 20a. Additionally, the controller 20c is electrically connected to the heating element 20a so as to transmit a control signal for controlling the heating element 20a to the heating element 20a. The output of the heating element 20a is controlled depending on the control signal. The controller 20c controls the output of the heating unit 20 on the basis of the measured temperature of the power supply cable 18 by a known control method such as PID control such that the measured temperature is equal to or lower than the operating temperature upper limit value of the power supply cable 18.

In addition, the controller 20c is realized by elements or circuits including a CPU and memories of a computer as a hardware configuration and is realized by computer programs as a software configuration, but is appropriately drawn in the drawings as functional blocks realized through the cooperation therebetween. It is clear for those skilled in the art that the functional blocks can be realized in various forms by the combination of hardware and software.

In this embodiment, the vacuum vessel 14, that is, the superconducting coil 12, is installed in the restricted access area 24. The power supply device 22 is installed outside the restricted access area 24, and the power supply cable 18 is led out of the restricted access area 24 from the airtight terminal 16a in the restricted access area 24. The heating unit 20 is disposed outside the restricted access area 24, and the heating element 20a is mounted on the power supply cable 18, as described above, outside the restricted access area 24.

The restricted access area 24 is set in advance around the superconducting coil 12 as an area where a magnetic field and/or radiation dose exceeding a reference may be generated, and the entry of a person into this area is restricted at least during the operation of the superconducting coil 12. The restricted access area 24 may be a radiation-controlled area.

During the operation of the superconducting magnet device 10, an exciting current is supplied from the power supply device 22 through the power supply cable 18 and the current lead 16 to the superconducting coil 12. Accordingly, the superconducting magnet device 10 can generate a strong magnetic field. In this case, since the superconducting coil 12 is cooled to the cryogenic temperature, the airtight terminal 16a can also be cooled by heat conduction through the current lead 16. Since the airtight terminal 16a is exposed to the surrounding environment of the vacuum vessel 14, there is a concern that moisture in the surrounding air condense or frost on the airtight terminal 16a. In some cases, moisture may freeze in the airtight terminal 16a.

However, according to the embodiment, the heating unit 20 heats the vacuum vessel 14 via the power supply cable 18. The power supply cable 18 is used as a heat transfer path from the heating element 20a to the airtight terminal 16a, and the heat generated by the heating element 20a is transmitted to the airtight terminal 16a via the power supply cable 18, particularly, a lead wire in the cable. In this way, the temperature drop of the airtight terminal 16a can be suppressed, and condensation, frosting, and freezing on the airtight terminal 16a can be prevented or reduced.

The heating unit 20 is disposed apart from the current lead 16, that is, the superconducting coil 12. By taking a distance from the superconducting coil 12, the heating unit 20 can be disposed in a location where the influence of the leaked magnetic field or radiation that can be generated by the superconducting coil 12 is low (for example, outside the restricted access area 24). Thus, the risk of failure of the heating unit 20 caused by the leaked magnetic field or radiation can be reduced as compared to a case where the heating unit 20 is directly attached to the current lead 16.

Additionally, in a case where the heating unit 20 is disposed outside the restricted access area 24, a worker can access the heating unit 20 even while the superconducting magnet device 10 is in operation, and can perform maintenance work such as inspection. Even if the heating unit 20 has failed, it is easy to cope with the failure.

In the above-described embodiment, the heating unit 20 has a mode in which the temperature adjustment of the heating element 20a is controlled by using the temperature sensor 20b and the controller 20c, but the present invention is not limited to this. The heating element 20a may heat the power supply cable 18 with a constant output. In this case, the heating unit 20 may not have the temperature sensor 20b and the controller 20c.

Figure 2:
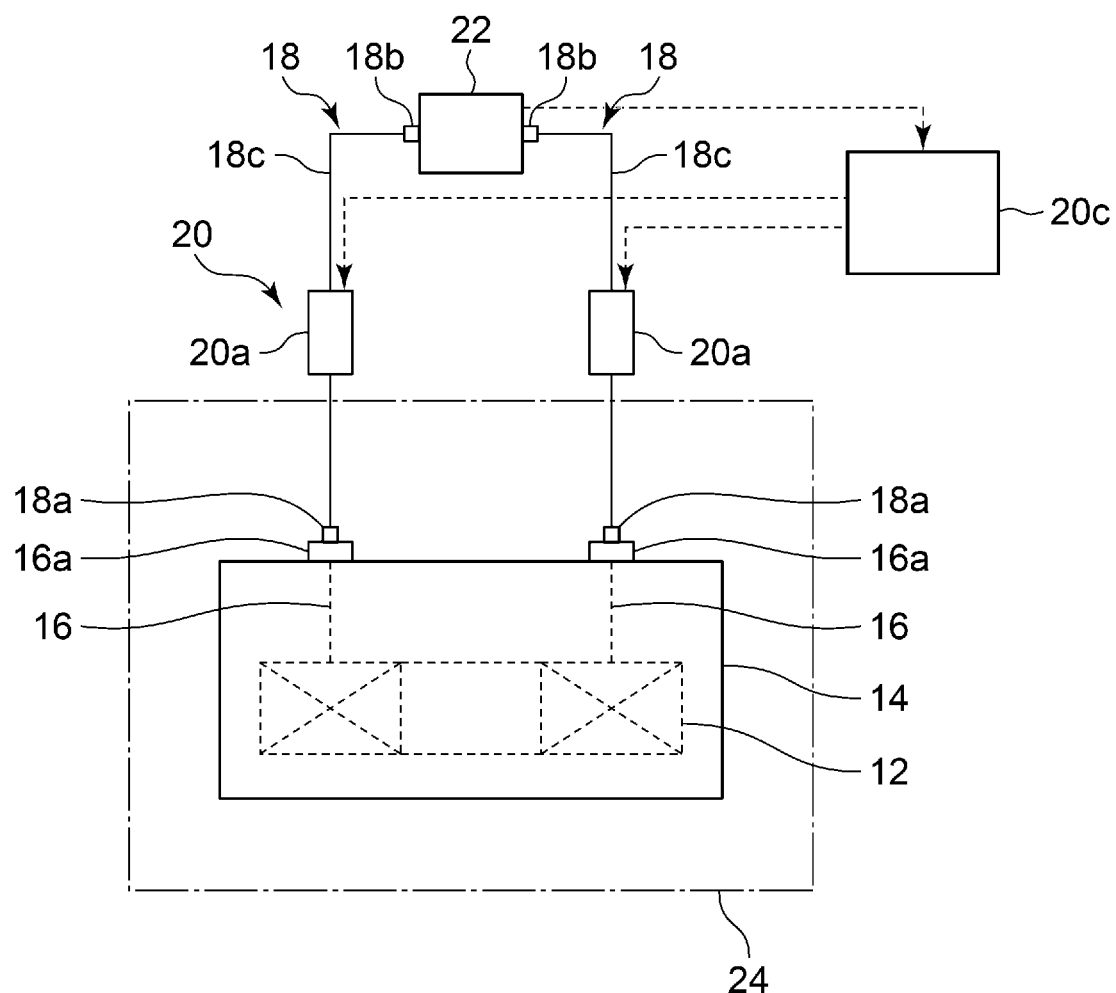
FIG. 2 is a schematic view showing a superconducting magnet device to another embodiment.

FIG. 2 is a schematic view showing a superconducting magnet device 10 according to another embodiment. Similar to the above embodiment, the superconducting magnet device 10 includes the superconducting coil 12, the vacuum vessel 14 that accommodates the superconducting coil 12, the current lead 16 that is connected to the superconducting coil 12 and installed in the vacuum vessel 14, the power supply cable 18 that is disposed outside the vacuum vessel 14 and connected to the current lead 16, and the heating unit 20 that is disposed apart from the current lead 16 and heats the current lead 16 via the power supply cable 18. The heating unit 20 is disposed outside the restricted access area 24.

In this embodiment, the heating unit 20 controls the output of the heating unit 20 depending on the energization state of the superconducting coil 12. Thus, the controller 20c is electrically connected to the power supply device 22 so as to receive a signal indicating the energization state of the superconducting coil 12 from the power supply device 22. On the basis of this signal, the controller 20c identifies the energization state of the superconducting coil 12, such as ON/OFF of the superconducting coil 12 or the magnitude of a current to be supplied to the superconducting coil 12.

For example, the controller 20c may turn on the heating element 20a when the superconducting coil 12 is off and turn off the heating element 20a when the superconducting coil 12 is on. When the superconducting coil 12 is on, a current flows through the power supply cable 18 and the current lead 16 to generate Joule heat, which can heat the airtight terminal 16a. In a case where it is expected that the freezing of the airtight terminal 16a can be prevented by utilizing this heating, the heating element 20a may be turned off.

Similarly, the controller 20c may turn on the heating element 20a when the magnitude of the current to be supplied to the superconducting coil 12 is smaller than a threshold value (for example, when the superconducting coil 12 is in idle operation). The controller 20c may turn off the heating element 20a when the magnitude of the current to be supplied to the superconducting coil 12 is equal to or greater than the threshold value (for example, when the superconducting coil 12 is in normal operation). The threshold value can be appropriately set on the basis of a designer's empirical knowledge or designer's experiments and simulations.

Instead of turning on the heating element 20a, the heating element 20a may operate at its highest output, or at a certain high first output. Additionally, instead of turning off the heating element 20a, the heating element 20a may operate at a second output lower than the highest output or the first output.

Even in this way, the temperature drop of the airtight terminal 16a can be suppressed, and condensation, frosting, and freezing on the airtight terminal 16a can be prevented or reduced. Additionally, it is possible to reduce the risk of failure of the heating unit 20 caused by the leaked magnetic field or radiation from the superconducting coil 12.

In addition, the control of the heating unit 20 based on the energization state of the superconducting coil 12 may be used in combination with the control of the heating unit 20 based on the measured temperature. For example, the controller 20c may control the output of the heating unit 20 such that the measured temperature is equal to or lower than the operating temperature upper limit value of the power supply cable 18 on the basis of the measured temperature of the power supply cable 18 by the temperature sensor 20b while the heating unit 20 is turned on on the basis of the energization state of the superconducting coil 12.

The present invention has been described above on the basis of the embodiment. It should be understood by those skilled in the art that the present invention is not limited to the above embodiment, that various design changes are possible and various modification examples are possible, and that such modification examples are also within the scope of the present invention. Various features described in relation to a certain embodiment can also be applied to other embodiments. New embodiments created by combination have the effects of respective combined embodiments in combination.

In a case where the restricted access area 24 is not set, the heating unit 20 may be provided in the vicinity of the airtight terminal 16a for efficient heating. For example, the heating element 20a may be mounted on the first end portion 18a of the power supply cable 18. Additionally, even in a case where the restricted access area 24 is set, the heating unit 20 may be disposed in the restricted access area 24 in order to heat more efficiently.

The heating unit 20 may have a non-contact-type heating element such as an infrared heater or a circulator, and the power supply cable 18 may be heated by such a non-contact-type heating element.

The present invention has been described using specific terms and phrases based on the embodiments, but the embodiments show only one aspect of the principles and applications of the present invention. In the embodiments, many modification examples and disposition changes are permitted within a range not departing from the concept of the present invention defined in the claims.

It should be understood that the invention is not limited to the above-described embodiment, but may be modified into various forms on the basis of the spirit of the invention. Additionally, the modifications are included in the scope of the invention.

What is claimed is:

1. A superconducting magnet device comprising:
    a superconducting coil;
    a vacuum vessel that accommodates the superconducting coil;
    a current lead that is connected to the superconducting coil and installed in the vacuum vessel;
    a power supply cable that is disposed outside the vacuum vessel and connected to the current lead; and
    a heating unit that is disposed outside the vacuum vessel and apart from the current lead to heat the current lead via the power supply cable,
    wherein the current lead comprises a coil-side end connected to the superconducting coil and an airtight terminal mounted on the vacuum vessel opposite to the coil-side end, and
    wherein the heating unit is disposed on the power supply cable apart from the airtight terminal.

2. The superconducting magnet device according to claim 1,
    wherein the heating unit includes a heating element that is mounted on the power supply cable.

3. The superconducting magnet device according to claim 1,
    wherein the superconducting coil is installed in a restricted access area, and
    wherein the heating unit is disposed outside the restricted access area.

4. The superconducting magnet device according to claim 1,
wherein the heating unit includes a temperature sensor that measures a temperature of the power supply cable, and controls an output of the heating unit on a basis of a measured temperature of the power supply cable by the temperature sensor such that the measured temperature is equal to or lower than an operating temperature upper limit value of the power supply cable.

5. The superconducting magnet device according to claim 1,
wherein the heating unit controls its output depending on an energization state of the superconducting coil.

6. The superconducting magnet device according to claim 1, further comprising:
a controller electrically connected to a power supply to receive a signal indicating an energization state of the superconducting coil from the power supply and configured to control an output of the heating unit based on the signal.

7. A superconducting magnet device comprising:
a superconducting coil;
a vacuum vessel that accommodates the superconducting coil;
a current lead that is connected to the superconducting coil and installed in the vacuum vessel;
a power supply cable that is disposed outside the vacuum vessel and connected to the current lead; and
a heating unit that is disposed outside the vacuum vessel and apart from the current lead to heat the current lead via the power supply cable,
wherein the current lead comprises a coil-side end connected to the superconducting coil and an airtight terminal mounted on the vacuum vessel at opposite to the coil-side end,
wherein the power supply cable comprises a first end connected to the airtight terminal, a second end connected to a power supply at opposite to the first end, and a cord connecting the first end and the second end, and
wherein the heating unit is attached to the cord.

* * * * *